United States Patent [19]

Catchpole

[11] Patent Number: 5,822,306
[45] Date of Patent: Oct. 13, 1998

[54] MULTIMEDIA SWITCHING APPARATUS

[75] Inventor: Andrew Catchpole, Suffolk, England

[73] Assignee: British Telecommunications public limited company, London, England

[21] Appl. No.: 684,261

[22] Filed: Jul. 19, 1996

[30] Foreign Application Priority Data

Apr. 12, 1996 [GB] United Kingdom .................... 9607615

[51] Int. Cl.$^6$ .................................................. H04L 12/66
[52] U.S. Cl. ............................ 370/261; 370/263; 370/401
[58] Field of Search ..................................... 370/259, 260,
370/261, 262, 263, 264, 265, 270, 271,
401, 402, 487, 490, 498, 522; 348/13, 14,
15, 16; 379/201, 202, 203, 204, 205, 215;
395/200.04

[56] References Cited

U.S. PATENT DOCUMENTS

| | | | |
|---|---|---|---|
| 5,450,123 | 9/1995 | Smith | 348/17 |
| 5,495,284 | 2/1996 | Katz | 348/15 |
| 5,602,598 | 2/1997 | Shintani | 348/565 |
| 5,619,557 | 4/1997 | Van Berkum | 379/88 |
| 5,625,404 | 4/1997 | Grady et al. | 348/7 |
| 5,636,218 | 6/1997 | Ishikawa et al. | 370/401 |

FOREIGN PATENT DOCUMENTS

| | | |
|---|---|---|
| 0377395 A2 | 7/1990 | European Pat. Off. . |
| 0571119 A1 | 11/1993 | European Pat. Off. . |
| A-2699034 | 12/1992 | France . |

OTHER PUBLICATIONS

Byte, "Computer Telephony", vol. 19, No. 7, Jul. 1994, St. Peterborough, US, pp. 80–96, XP000445517.
Kerr, "A Multi-Site Videophone PBX System", Int. Conference on Private Switching Systems and Networks, Jun. 21–23, 1988, UK, pp. 215–219, XP000601059.

*Primary Examiner*—Chi H. Pham
*Assistant Examiner*—Kwang B. Yao
*Attorney, Agent, or Firm*—Nixon & Vanderhye P.C.

[57] ABSTRACT

A multimedia switching apparatus switches multimedia signals including audio and video signals received from a public telecommunications network to distribute the multimedia signals automatically. The gateway receives the multimedia signals and generates a separate audio and video signal output. The audio signal is switched by an audio switch to a destination under the control of an automatic call distribution arrangement to automatically control the switching of the audio signal. A separate video switch is provided for switching the video signal to a destination logically associated with the destination of the audio signal. The video switch is controlled by monitoring the events in the audio switch to control the switching of the video signal so that it is switched to the logically associated destination. The switching operations of the audio switch are copied by the video switch.

26 Claims, 2 Drawing Sheets

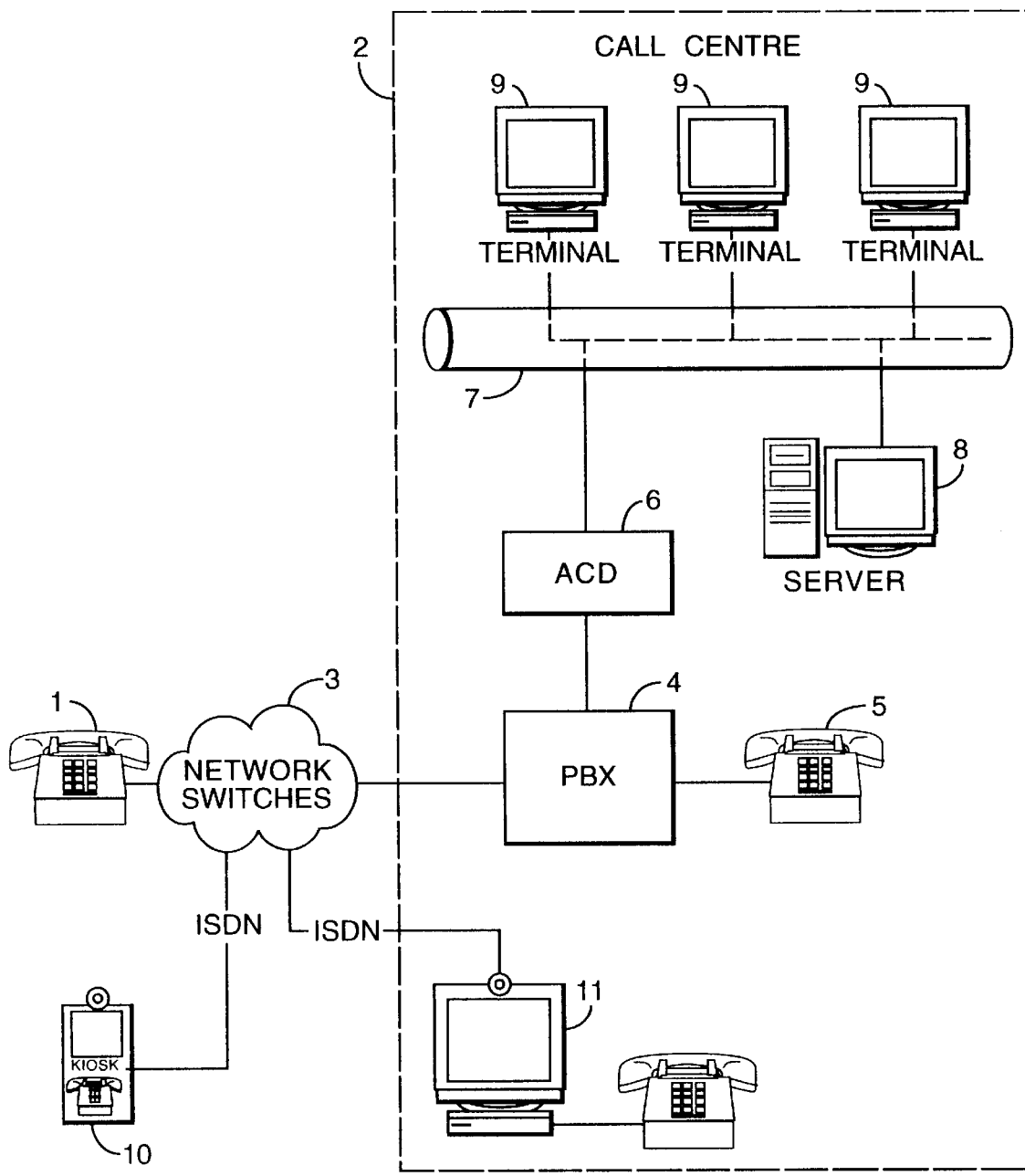

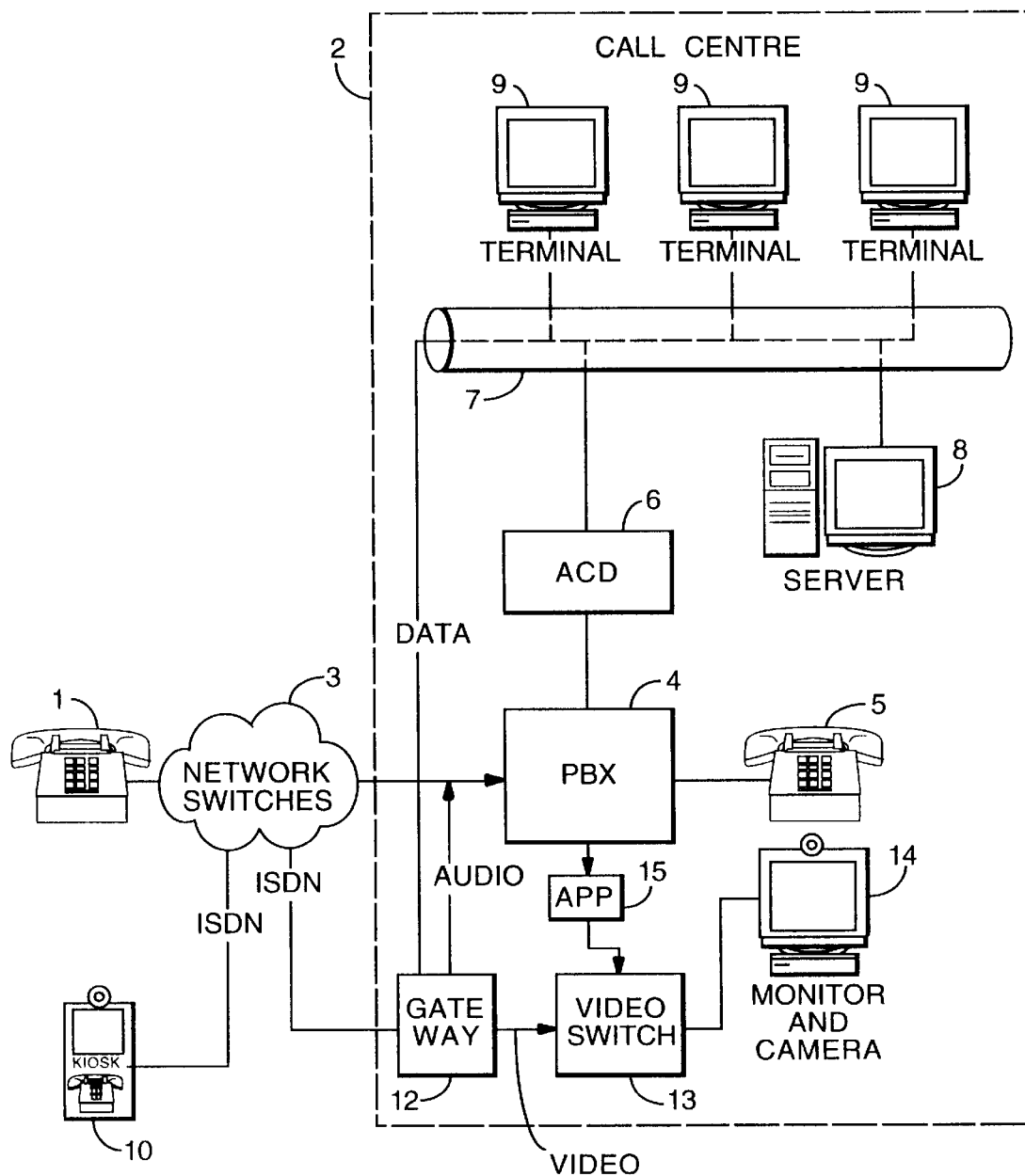

MULTIMEDIA SWITCHING APPARATUS

BACKGROUND OF THE INVENTION

1. Field of the Invention

The present invention relates to multimedia switching apparatus for switching multimedia signals comprising audio and video signals received from a telecommunications network to automatically distribute the multimedia signals. In particular, the present invention relates to such a switching apparatus which uses automatic call distribution, for instance, in a call center environment. In a call center environment, calls received at the call center are automatically distributed to destinations.

2. Related Art

FIG. 1 illustrates a switching arrangement in a call center environment. When a customer uses a telephone handset 1 to connect to a call center 2 over the public switched telephony network (PSTN) 3, the audio call is received by a private branch exchange (PBX) 4 in the call center 2. The PBX 4 switches the audio signal to a telephone handset 5 in the call center in dependence upon the automatic call distribution (ACD) application 6 controlling the PBX 4. The ACD application 6 receives the dialled telephone number and the telephone number identifying the caller on the telephone handset 1, and determines where to route the audio telephone call i.e. how to control the PBX 4. Within the call center 2 the ACD application 6 can be modified or updated over a local area network 7 such as an ethernet by a server 8 or from a terminal 9. In this way, a call center can operate flexibly and the ACD application 6 can be updated and modified as required in order to ensure that calls are automatically distributed efficiently.

There is a requirement for not only providing for an audio interaction between a customer and agents within a call center, but also to provide for video interaction and possibly for the exchange of data. Such a facility is currently available whereby audio and visual interaction can be accomplished using a kiosk 10 which is connected to the call center 2 via one or more Integrated Digital Service Network (ISDN) channels over the switching network 3. In the call center 2 a video monitor, video camera and hand set are provided at a location in a kiosk connected to an ISDN line. Such ISDN technology exists and VC8000, VC2400 terminals available from British Telecommunications PLC can be used to enable audio, video and data communications over ISDN lines.

This arrangement however suffers from the disadvantage that such ISDN technology cannot be used in traditional call centers for a number of reasons. Conventional call centers do not have PBX with ISDN capabilities and calls may not therefore be transferred from one agent within a call center to another. Further, if the multimedia signals containing audio, video and data consume more than one ISDN channel, current technology does not allow multiple ISDN channels to be routed to an agent.

It is therefore an object of the present invention to provide a multimedia switching apparatus capable of switching at least audio and video signals within a call center environment.

The present invention provides a multimedia switching apparatus for switching multimedia signals comprising at least audio and video signals received from a telecommunications network to distribute said multimedia signals automatically, said apparatus comprising:

gateway means for receiving said multimedia signals and generating at least an audio output signal and a video output signal;

audio signal switching means for receiving and switching said audio output signal to a destination;

automatic call distribution means including parameter storage means for controlling said audio signal switching means to switch said audio output signal automatically to said destination determined by parameters in said parameter storage means;

video switching means for receiving and switching said video output signal to a destination logically associated with the destination of said audio output signal; and video switch controlling means for controlling the switching of said video switching means, said video switch controlling means being adapted to monitor events during the switching of said audio output signal by said audio switching means, and to control the switching of said video output signal by said video switching means, to switch said video output signal to the logically associated destination, the switching operations of said audio switching means being copied by said video switching means.

Thus in the present invention the audio signal contained within the multimedia signal received from the public or private telecommunications network is separated and switched conventionally under the control of an ACD application. The events during the switching of the audio signal are monitored and used to control a separate video switch to switch video signals separated from the multimedia signal. In this way the switching of the video switch mirrors the switching of the audio switch and the audio and video signals are routed to the same physical location. This enables the video signals to follow the audio signals so that they can be held or transferred to other physical locations mirroring the operations on the audio signals.

Where the multimedia signals are received over one or more ISDN channels in a multiplexed form, these are demultiplexed to generate the audio and video signals. If the video signal component of the multimedia signal is compressed, the level of compression determines the number of ISDN channels required and the compressed video signals are decompressed by the gateway means in the call center.

Conventionally, the video signals comprise analog composite picture signals e.g. PAL or NTSC, which are communicated to and from the video switch to video monitors and cameras at the physical locations within the call center using video quality cable.

In one embodiment the multimedia signal also includes a data signal and the gateway means is adapted to generate a data output signal from the multimedia signal. The data signal can comprise data in any proprietary protocol e.g. TCP/IP. This data can be passed over a local area network such as an ethernet to terminals which can be provided at the same physical location as the telephone handsets, the video monitors and the video cameras thus providing an agent in a call center with the ability to receive and send audio signals, video signals and data.

BRIEF DESCRIPTION OF THE DRAWINGS

Embodiments of the present invention will now be described with reference to the accompanying drawings in which:

FIG. 1 is a schematic drawing of a multimedia call center environment according to the prior art; and FIG. 2 is a schematic drawing of a call center environment in accordance with one embodiment of the present invention.

DETAILED DESCRIPTION OF EXEMPLARY EMBODIMENTS

Referring now to FIG. 2, in which an embodiment of the present invention is illustrated, a call center 2 is still able to receive telephone calls from a conventional telephone handset 1 which uses either an analog or digital (ISDN) link over the public switched telephony network (PSTN) 3. The audio signal is switched in a conventional manner by the PBX 4 to a telephone handset 5 within the call center 2. As in a conventional call center, the PBX 4 is controlled by an ACD 6 to automatically distribute the incoming call to the appropriate handset 5. The ACD 6 is connected to the PBX 4 by a Computer Telephony Integration (CTI) link and it allows the ACD 6 to monitor and control the operation of the PBX 4.

The CTI link provides an interface over which a computer can control and monitor the PBX 4. CTI protocols define the message interface to the switch and applications running in the computer and thus control and monitor the PBX 4. There are many types of CTI interfaces, many of which are proprietary. An example of an open CTI interface is telephony services application programming interface (CSAPI).

Using the CTI link the ACD 6 can provide a highly flexible call controlling environment and the efficient distribution of incoming calls.

Where the present invention differs over the prior art is that instead of providing a separate video capability, the call center is provided with a multitmedia switching capability whereby both audio and video signals can be switched to the same physical location i.e. to destinations for the audio and video signals which are logically associated.

As in the prior art a kiosk 10 provides a user with the ability to generate audio, video and data signals which are multiplexed over one or more ISDN channels which are switched within the public switched telephony network (PSTN) 3. Within the call center 2 there is provided a gateway 12 which receives the multimedia signal over one or more ISDN channels and demultiplexes it to generate output audio, video and data signals. The gateway 12 can comprise any of the VC7000, VC8000 or VC2400 gateways available from British Telecommunications PLC.

The multimedia signal generated by the kiosk can include a video signal component which is compressed. The level of compression will determine the number of ISDN channels which are required to transmit the multiplexed multimedia signal. The gateway 12 is able to receive the multiplexed multimedia signal over the ISDN channels, demultiplex the signal and decompress the video signal component in order to generate the separate audio, video and data signals.

The audio signal output from the gateway 12 is then fed into the PBX 4 so that it can be switched in a conventional manner to a telephone handset 5 under the control of the ACD 6. In this way, the audio signal component of the multimedia signal from the kiosk 10 can be subjected to the usual automatic call distribution thus providing all of the benefits associated therewith.

The video signal output from the gateway 12 is fed to a separate video switch 13 which can comprise a Hedco 16X series video router made by the Canadian company Leitch Video International Inc or the Microvitec video switch available from Microvitec PLC. The video output from the gateway 12 can comprise any analog composite picture format e.g. PAL or NTSC. The video switch switches the analog composite picture signal to a destination which is logically associated with the destination of the audio signal output. The analog composite picture signal is transmitted over video quality cable to the destination at which there is provided a video monitor, or a computer with a video capture card, and a video camera 14.

The switching by the video switch 13 is controlled by an application 15. Like the ACD 6, the application 15 is able to monitor events in the PBX 4 using a CTI link. The application 15 can be hosted in a computer server and can control the video switch 13 via a serial link thereto e.g. an RS232 link.

The application 15 configures the video switch 13 such that its output ports are logically associated with each of the output ports of the PBX 4. In this way, destinations of video signals from the video switch 13 can be made to be logically associated with destinations of audio signals from the PBX 4. Using the CTI link to the PBX 4, the application 15 can detect when calls are connected to a telephone handset 5, and can then control the video switch 13 to connect the video signal to the logically associated destination to provide not only an audio link but also a video link at a physical location. In this way the connections made by the PBX 4 are shadowed by the video switch 13 i.e. the switching of the audio signals is shadowed by the switching of the video signals. Thus, all of the features of the PBX 4 such as call transfer, call pick-up, call diversion etc are copied by the video switch 13 automatically. The video switch 13 thus derives all its call connection information from the associated PBX 4. In this way it is possible for the application 15 to control the video switch 13 to switch a video signal to the monitor and camera 14 only when the audio signal has been responded to i.e. the call is answered at the telephone handset 5. This can be achieved using the CTI link by, when an extension number is entered as being a destination for a telephone handset 5, the device i.e. the telephone handset 5 at that destination or extension is monitored by the application 15. Any event information received for that device is then interpreted to see if a request should be made to the video switch 13. For example, if a connection event is received for a device then the device identity is checked to see if it is also a video user. If it is a video user, the video switch 13 can be requested to connect the video signal to the relevant video port or destination.

In FIG. 2 the ACD 6 is shown separately to the PBX 4 and can comprise an application running on a host computer. The application comprising the ACD 6 can be integrated with the application 15 controlling the video switch 13. Further, although the ACD 6 is shown separate to the PBX 4 in FIG. 2, the ACD 6 can be hosted in the PBX 4. Similarly, the application 15 controlling the video switch 13 can be hosted by the PBX 4.

As in the prior art, the data or the program code of the application comprising the ACD 6 can be updated by a server 8 over a LAN 7 such as an ethernet. In this way, call distribution within the call center 2 can be flexibly controlled.

In addition to the audio and video output signals in the gateway 12, data signals can also be output which can for instance contain customer information or information entered by the user at the kiosk 10. The data signals are output from the gateway 12 and can be sent over the LAN using a proprietary protocol or a standard data protocol such as TCP/IP. The server 8 is able to control the distribution of the data over the LAN 7 to distribute data to terminals 9 which can also be provided at the same physical location as the telephone handset 5 and the video monitor and camera 14. In this way, within a call center environment video, audio and data information generated in a kiosk 10 can be switched to a physical location.

In order to control the switching of the data, the application 15 can also be connected to the gateway 12 in order to control the communication of the data signals over the LAN 7 to ensure that the data signals are addressed correctly to route them over the LAN to the desired terminal.

Although in FIG. 2 the switching of data is illustrated as occurring over the LAN 7, as an alternative, a separate data switch can be provided and data lines provided to terminals at the physical locations. Such a data switch can be controlled by the application 15 in a similar manner to the video switch 13. Such an arrangement does however duplicate the data network 7, 8 and 9 already available within a call center 2 and thus the arrangement illustrated in FIG. 2 is believed to make the most efficient use of the infrastructure already available in a call center 2.

As can be seen from the embodiment illustrated in FIG. 2, the present invention provides a multimedia switching apparatus which provides for the switching of audio and video data in a call center environment utilising existing audio switching network. A video switching capability is added simply by adding a separate video switch which shadows the switching operation of the PBX.

Although embodiments of the present invention have been described hereinabove with reference to the drawings, it will be understand by a skilled person in the art that modifications can be made which fall within the scope of the present invention.

What is claimed is:

1. A multimedia switching apparatus for switching multimedia signals comprising at least audio and video signals received from a public telecommunications network to distribute said multimedia signals automatically, said apparatus comprising:

gateway means for receiving said multimedia signals and generating at least an audio output signal and a video output signal;

audio signal switching means for receiving and switching said audio output signal to a destination;

automatic call distribution means including parameter storage means for controlling said audio signal switching means to switch said audio output signal automatically to said destination determined by parameters in said parameter storage means;

video switching means for receiving and switching said video output signal to a destination logically associated with the destination of said audio output signal; and video switch controlling means for controlling the switching of said video switching means, said video switch controlling means being adapted to monitor events during the switching of said audio output signal by said audio switching means, and to control the switching of said video output signal by said video switching means, to switch said video output signal to the logically associated destination, the switching operations of said audio switching means being copied by said video switching means.

2. Apparatus as claimed in claim 1 wherein said automatic call distribution means includes a software application running on a host processor which, when said audio switching means receives an audio output signal, looks up a switching route for the switching of said audio output signal, and controls said audio signal switching means accordingly.

3. Apparatus as claimed in claim 2 wherein said automatic distribution means is included in said audio signal switching means.

4. Apparatus as claimed in claim 1 wherein said audio signal switching means comprises a private branch exchange.

5. Apparatus as claimed in claim 1 wherein said multimedia signal is supplied to said gateway means on n ISDN channels, where n is an integer, and said audio and video signals are multiplexed to form said multimedia signal, said gateway means being adapted to demultiplex said multimedia signal to generate said audio output signal and said video output signal.

6. Apparatus as claimed in claim 5 wherein said video signal component of said multimedia signal is compressed and the level of compression determines the number n of ISDN channels used.

7. Apparatus as claimed in claim 1 wherein said automatic call distribution means is adapted to allow said audio output signal to be put on hold or transferred by a user at said destination, said video switch control means being adapted to monitor a hold or transfer event in said audio switching means caused by said audio output signal being put on hold or being transferred, and to control the switching of said video output signal by said video switching means so as to similarly hold or transfer said video output signal.

8. Apparatus as claimed in claim 1 including a telephone handset, video monitor means and a video camera provided at each said logically associated destination, said video camera and said video monitor being connected to said video switching means by video quality cable.

9. Apparatus as claimed in claim 1 wherein said video switch controlling means is adapted to control said video switching means to switch said video output signal only after said audio output signal switched by said audio switching means has been connected and the line is off-hook.

10. Apparatus as claimed in claim 1 wherein said multimedia signal includes a data signal, said gateway means being adapted to generate a data output signal.

11. Apparatus as claimed in claim 10 including terminal means provided at said physical locations for receiving said data output signal, and a local area network and a server means for receiving said data output signals and distributing said data output signals to appropriate said terminal means.

12. Apparatus as claimed in claim 1 including programming means for updating or modifying said parameters in said parameter storage means of said automatic call distribution means for modifying the automatic distribution of said audio output signals by said audio signal switching means.

13. Apparatus as claimed in claim 1 wherein said parameters comprise computer code and/or variables used by computer code.

14. Apparatus as claimed in claim 13 wherein said variables include switching routes for said audio output signal.

15. Apparatus as claimed in claim 1 wherein said gateway means is adapted to determine if there is a logically associated destination for said video output signal to the destination for said audio output signal, and if there is a logically associated destination for said video output signal, said video switching means is controlled to switch said video output signal to said logically associated destination.

16. Apparatus as claimed in claim 1 wherein said video switch controlling means is adapted to monitor said audio switching means using a Computer Telephony Integration (CTI) link.

17. Apparatus as claimed in claim 8 wherein said video monitor means comprises a computer with a video capture card.

18. Apparatus as claimed claim 1 wherein said video switch controlling means is adapted to receive a signal from said audio switching means indicating that a said audio output signal is being switched to a destination, to monitor said destination, and to control said video switch controlling means to switch said video output signal to said logically associated destination once it is determined from said monitoring that said destination has received and is responding to said audio output signal.

19. Apparatus as claimed in claim 1 wherein said automatic call distribution means and said video switch controlling means comprise a single software application hosted in said audio switch means or a separate processing means.

20. A multimedia switching method for switching multimedia signals comprising at least audio and video signals received from a public telecommunications network to distribute said multimedia signals automatically, said method comprising:

receiving said multimedia signals via a gateway and generating at least an audio output signal and a video output signal;

receiving and switching said audio output signal to a destination;

controlling said audio signal switching to switch said audio output signal automatically to said destination determined by stored parameters;

receiving and switching said video output signal to a destination logically associated with the destination of said audio output signal; and controlling the video switching by monitoring events during the switching of said audio output signal and controlling the switching of said video output signal to the logically associated destination by copying the audio switching operations.

21. Method as in claim 20 wherein said automatic call distribution uses a software application running on a host processor which, when said audio output signal is received for switching, a switching route is looked up for the switching of said audio output signal, and it controls said audio signal switching accordingly.

22. Method as in claim 21 wherein said automatic distribution is included in said audio signal switching.

23. Method as in claim 20 wherein said audio signal switching is done using a private branch exchange.

24. Method as in claim 20 wherein said multimedia signal is supplied to said gateway on n ISDN channels, where n is an integer, and said audio and video signals are multiplexed to form said multimedia signal, said gateway being adapted to demultiplex said multimedia signal to generate said audio output signal and said video output signal.

25. Method as in claim 24 wherein said video signal component of said multimedia signal is compressed and the level of compression determines the number n of ISDN channels used.

26. Method as in claim 20 wherein said automatic call distribution is adapted to allow said audio output signal to be put on hold or transferred by a user at said destination, said video switch control being adapted to monitor a hold or transfer event in said audio switching caused by said audio output signal being put on hold or being transferred, and to control the switching of said video output signal by said video switching step so as to similarly hold or transfer said video output signal.

* * * * *